(12) United States Patent
Acocella

(10) Patent No.: US 8,972,108 B2
(45) Date of Patent: Mar. 3, 2015

(54) METHOD AND APPARATUS FOR CONTROLLING A SEMI-ACTIVE SUSPENSION SYSTEM FOR MOTORCYCLES

(75) Inventor: Gerardo Acocella, Salerno (IT)

(73) Assignees: Spring Off S.R.L., Fiscioano (IT); Gerardo Acocella, Salerno (IT)

( * ) Notice: Subject to any disclaimer, the term of this patent is extended or adjusted under 35 U.S.C. 154(b) by 0 days.

(21) Appl. No.: 13/056,955

(22) PCT Filed: Aug. 6, 2009

(86) PCT No.: PCT/EP2009/005721
§ 371 (c)(1),
(2), (4) Date: Mar. 1, 2011

(87) PCT Pub. No.: WO2010/022852
PCT Pub. Date: Mar. 4, 2010

(65) Prior Publication Data
US 2011/0153158 A1 Jun. 23, 2011

(30) Foreign Application Priority Data
Aug. 6, 2008 (IT) ................ SA2008A0021

(51) Int. Cl.
*B60G 17/018* (2006.01)
*B62K 25/04* (2006.01)

(52) U.S. Cl.
CPC ............ *B62K 25/04* (2013.01); *B60G 2300/12* (2013.01); *B60G 2400/0522* (2013.01); *B60G 2400/252* (2013.01); *B60G 2500/10* (2013.01); *B60G 2600/184* (2013.01)
USPC ............................................. 701/37

(58) Field of Classification Search
USPC ........... 188/266.2; 701/37, 38; 280/5.507, 5.5
See application file for complete search history.

(56) References Cited

U.S. PATENT DOCUMENTS

| 3,807,678 | A | * | 4/1974 | Karnopp et al. | 248/562 |
| 4,821,849 | A | * | 4/1989 | Miller | 188/280 |
| 4,881,172 | A | * | 11/1989 | Miller | 701/37 |
| 5,020,781 | A | | 6/1991 | Huang | 267/136 |
| 5,062,658 | A | * | 11/1991 | Majeed | 280/5.503 |
| 5,269,557 | A | * | 12/1993 | Butsuen et al. | 280/5.515 |
| 5,276,622 | A | * | 1/1994 | Miller et al. | 701/37 |

(Continued)

FOREIGN PATENT DOCUMENTS

| JP | 020133529 | A | * | 6/2010 |
| WO | WO 2005/107358 | | | 11/2005 |
| WO | WO 2008/010075 | | | 1/2008 |

*Primary Examiner* — John R Olszewski
*Assistant Examiner* — Jean-Paul Cass
(74) *Attorney, Agent, or Firm* — Fattibene and Fattibene LLC; Paul A. Fattibene

(57) ABSTRACT

A method and an apparatus for controlling a semi-active suspension system (1) for motorcycles are described. According to the present invention, the damping forces applied to controllable force generators (2, 3), such as controllable shock absorbers, provided to the front and the rear semi-active suspensions of a motorcycle are jointly controlled. In particular, the pitch velocity ($V_p$) of the suspended mass ($M_s$) is taken into account so as to jointly control the front and rear suspension systems of a motorcycle. The present invention allows the optimization of the global adherence of the motorcycle to the road surface and of the driving and the travelling comfort of the vehicle.

1 Claim, 10 Drawing Sheets

(56) References Cited

U.S. PATENT DOCUMENTS

| | | | |
|---|---|---|---|
| 5,398,184 A * | 3/1995 | Yamaoka et al. | 701/82 |
| 5,439,245 A * | 8/1995 | Breitenbacher et al. | 280/5.518 |
| 5,497,324 A * | 3/1996 | Henry et al. | 701/37 |
| 5,839,082 A * | 11/1998 | Iwasaki | 701/37 |
| 6,115,658 A * | 9/2000 | Ahmadian et al. | 701/37 |
| 6,181,997 B1 * | 1/2001 | Badenoch et al. | 701/37 |
| 6,249,728 B1 * | 6/2001 | Streiter | 701/37 |
| 6,619,672 B2 * | 9/2003 | Charaudeau et al. | 280/5.512 |
| 6,633,803 B1 * | 10/2003 | Shal et al. | 701/37 |
| 7,035,836 B2 * | 4/2006 | Caponetto et al. | 706/47 |
| 7,340,334 B2 | 3/2008 | Izawa et al. | 701/37 |
| 7,520,372 B2 * | 4/2009 | Fox | 188/275 |
| 7,526,665 B2 * | 4/2009 | Kim et al. | 713/500 |
| 7,887,064 B2 * | 2/2011 | Inoue | 280/5.5 |
| 7,921,973 B2 * | 4/2011 | Wereley et al. | 188/266 |
| 2002/0166741 A1 * | 11/2002 | Kock et al. | 188/266.1 |
| 2006/0163825 A1 * | 7/2006 | Hamm | 280/5.502 |
| 2007/0213899 A1 | 9/2007 | Watanabe et al. | 701/37 |
| 2009/0121444 A1 * | 5/2009 | Bushko et al. | 280/5.507 |
| 2010/0023211 A1 * | 1/2010 | Ammon et al. | 701/37 |
| 2010/0049394 A1 * | 2/2010 | Ammon et al. | 701/29 |
| 2012/0055745 A1 * | 3/2012 | Buettner et al. | 188/266.2 |

* cited by examiner

METHOD AND APPARATUS FOR CONTROLLING A SEMI-ACTIVE SUSPENSION SYSTEM FOR MOTORCYCLES

FIELD OF THE PRESENT INVENTION

The present invention relates to the field of motorcycles. In particular, the present invention relates to a method for controlling a semi-active suspension system for motorcycles and to a control apparatus for carrying out said method. Even more in particular, the present invention relates to a method and to a corresponding apparatus for jointly controlling the damping forces applied to controllable shock absorbers provided to the front and the rear semi-active suspensions of a motorcycle.

STATE OF THE ART

Suspension Systems for Vehicles can be Generally Grouped into Three Categories passive suspension systems characterized by shock absorbers having a fixed damping factor predetermined during the project phase of the vehicle;

active suspension systems provided with shock absorbers having a variable damping coefficient varying in a continuous way by means of an appropriate control system;

semi-active suspension systems provided with shock absorbers having a variable damping coefficient varying in a continuous way similar to active suspension systems with the difference that in semi-active suspension systems the shock absorbers do not require external energy to control the characteristics of the damping force. In fact, in a semi-active suspension system, the control is only used to properly dissipate the energy of the shock absorbers.

Passive suspension systems do not allow for the simultaneous optimization of both the driving comfort and the road holding. On the contrary, active and semi-active suspension systems enable a flexible choice by varying the damping coefficients of the shock absorbers in real time on the basis of a set of measured signals relating to the dynamic of the vehicle. Semi-active suspension systems have been widely employed mainly because of their lower manufacturing costs and lower design complexity with respect to active suspension systems.

The known solutions based on semi-active suspension systems differ from one another because of the kind of shock absorbers employed and because of the control methods adopted.

With respect to the first aspect, the main kinds of shock absorber technologies relates to:

CDC (Continuously Damping Control) shock absorbers, wherein the damping factor is varied by properly decreasing or increasing the section of the openings that connect the upper chamber with the lower chamber of the piston of the shock absorber;

Electro-rheological or magneto-rheological shock absorbers functioning by means of fluids having variable viscosity according to a proper applied electric or magnetic field, respectively.

As far as the control methods are concerned, several kinds of methods and control apparatuses for semi-active suspension systems of a vehicle have been proposed. Most of them relate to a "quarter car" model for the vehicle suspension system and to a Sky Hook type control.

Starting from this basic strategy, several solutions have been implemented in order to improve some of the critical aspects as shown in several prior art documents such as:

U.S. Pat. No. 6,115,658;
U.S. Pat. No. 7,035,836;
U.S. Pat. No. 7,340,334;
WO 2008/010075 A2

Document U.S. Pat. No. 6,115,658 relates to an improvement of the continuous Sky Hook control (i.e. wherein the damping coefficient may assume high values in a wide range during the On state) by introducing an additional factor in the product of the control. The additional factor is a smoothing function of the absolute velocity, such as absolute value functions and exponential functions. In this way it is possible to obtain three-dimensional control surfaces (showing the target damping force as a function of the absolute value of the velocity of the frame and the relative velocity between the suspended mass and the non suspended mass) without the typical discontinuities that are present in the classical control methods and give rise to jerkiness and to elevated pulses in the acceleration of the suspended mass.

Document U.S. Pat. No. 7,035,836 describes a control method based on the determination and optimization of the index of ride comfort based on a Sky Hook control model by means of a fuzzy logic regulator taking into account various information about the dynamics of the vehicle measured by means of appropriate sensors.

Document U.S. Pat. No. 7,340,344 relates to the improvement of the independent control on each of the four suspensions of a vehicle according to a classic Sky Hook approach based on the determination of the sign of the product of the value corresponding to the relative displacement and the value corresponding to the relative velocity of the suspended mass and the non suspended mass by introducing correction factors in the value of the damping coefficient taking into account the velocity of the vehicle and its lateral and longitudinal acceleration.

According to document WO2008/010075 A2, the classical two-stages Sky Hook approach is improved by a control strategy that identifies regions characterized by low and high working frequencies by comparing the ratio between the square of the accelerations and the square of the speeds of the suspended and the non suspended masses and an appropriate invariant frequency.

The methods and apparatuses described in the state of the art only allow for the control of each of the suspension separately. In particular, in the case of motorcycles, the front suspension is controlled separately from the rear suspension. Accordingly, the methods and apparatuses described in the state of the art do not allow to optimize the driving comfort and the road holding properties of the motorcycles. In particular, since the front and the rear suspension systems are controlled separately, the driving performances of the motorcycle can not be optimized. For instance, the global adherence of the motorcycle to the road surface can not be optimized because the front and the rear pneumatic tires can not be jointly controlled. Moreover, for the same reason, the driving comfort can not be optimized. Furthermore, the travelling comfort can not be optimized.

SCOPE OF THE INVENTION

In view of the problems relating to the known systems, it is an object of the present invention to provide a method for controlling a semi-active suspension system for motorcycles and a corresponding apparatus for carrying said method allowing to overcome these problems. In particular, it is an object of the present invention to provide a method for controlling a semi-active suspension system for motorcycles that allows the optimization of the driving performances of the motorcycle. It is a further object of the present invention to provide a method for controlling a semi-active suspension system for a motorcycle that allows the optimization of the road holding properties of the motorcycles. It is a further object of the present invention to provide a method that allows the optimization of the global adherence of the motorcycle to the road surface. It is still an object of the present invention to provide a method for controlling a semi-active suspension system for a motorcycle allowing the optimization of both the driving and travelling comfort of the motorcycle. It is a further object of the present invention to provide an apparatus for carrying out the method according to the present invention.

SUMMARY OF THE INVENTION

The present invention relates to a method for controlling a semi-active suspension system for motorcycles. In particular, the present invention relates to a joint control method of the damping forces to be applied to the controllable shock absorbers provided to the front and rear suspensions, respectively, of a motorcycle in order to regulate the oscillations of the non-supported masses (such as the front and rear wheels) so as to improve the road holding performance and the oscillation of the suspended mass (such as the body of the motorcycle) so as to improve the driving comfort.

The present invention is based on the inventive concept of jointly controlling the front and the rear suspension systems of a motorcycle. In particular, the present invention is based on the inventive concept of taking into account the pitch velocity of the suspended mass so as to jointly control the front and the rear suspension systems of a motorcycle.

According to a first embodiment of the present invention a method for controlling a semi-active suspension system for a motorcycle is provided, said method comprising the following steps:
  determination of a first signal corresponding to the relative velocity between a suspended mass and a front non-suspended mass;
  determination of a second signal corresponding to the relative velocity between the suspended mass and a rear non suspended mass;
  determination of a third signal corresponding to the pitch angular velocity of the suspended mass so as to take into account the coupling between the motions of the front and rear suspensions;
  determination of the damping force to be generated by a front controllable force generator on the basis of the first and the third signal;
  determination of the damping force to be generated by a rear controllable force generator on the basis of the second and the third signal.

The present invention further concerns, moreover, a controller for jointly controlling the damping forces concerning the front and rear controllable force generators of a motorcycle.

According to a preferred embodiment of the present invention, the controller is adapted to determine the damping forces according to the control method of the present invention.

DETAILED DESCRIPTION

In the following, the present invention is described with reference to particular embodiments as shown in the enclosed drawings. Nevertheless, the present invention is not limited to the particular embodiments described in the following detailed description and shown in the figures, but, instead, the embodiments described simply exemplify several aspects of the present invention, the scope of which is defined by the appended claims.

Further modifications and variations of the present invention will be clear for the person skilled in the art. Therefore, the present description has to be considered as including all the modifications and/or variations of the present invention, the scope of which is defined by the appended claims.

In this specification, the terms front, rear, left, right, up, down clockwise and counterclockwise mean the front, rear, left, right, upward, downward, clockwise and counterclockwise directions, respectively, as viewed by a driver seated in driving position on the seat of the motorcycle unless otherwise specified. For simplicity, identical or corresponding elements such as device components, signals and physical quantities are indicated in the figures with the same reference numbers or symbols.

Figure 1:
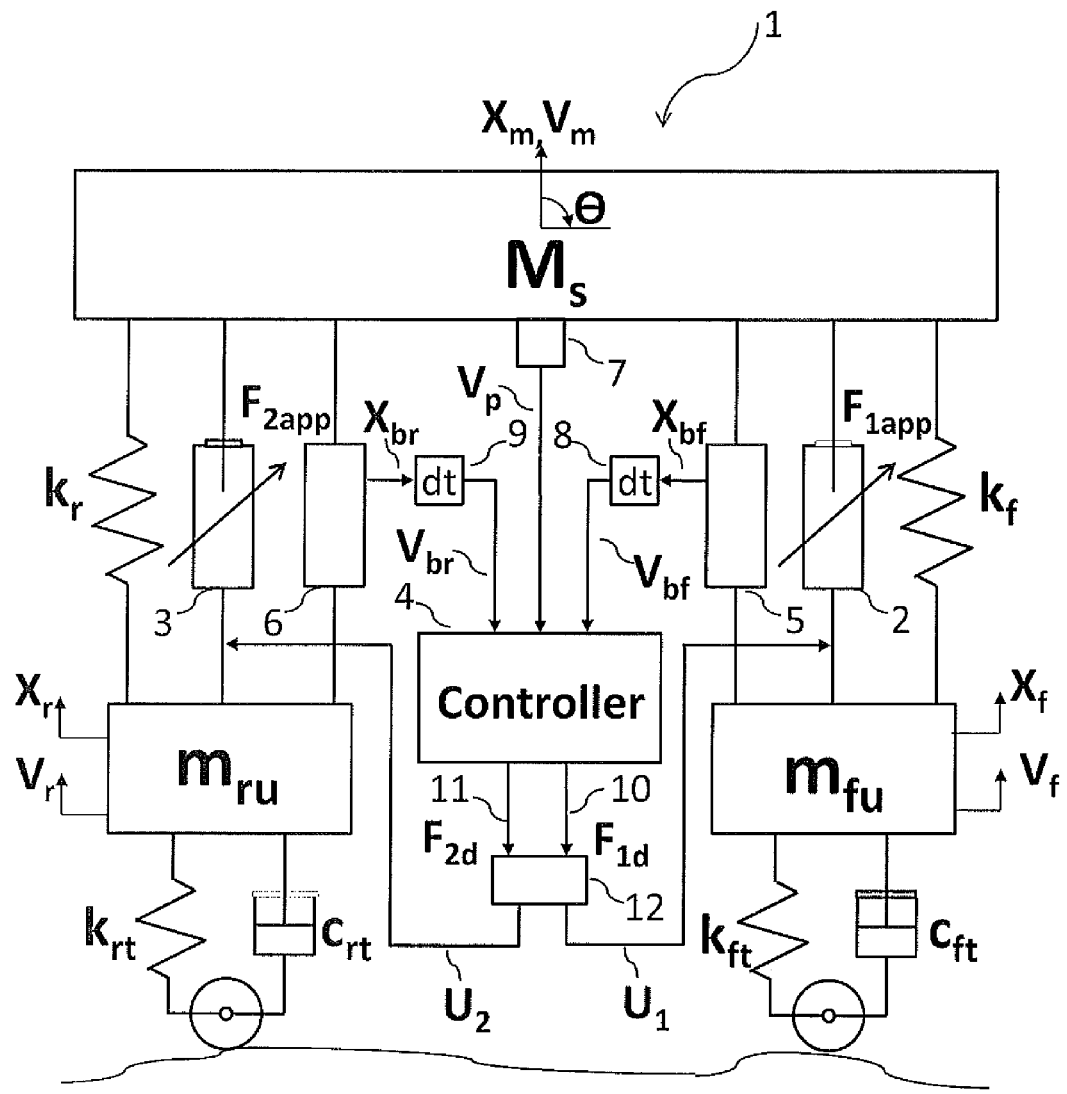
FIG. 1 schematically displays a first embodiment of the system according the present invention.

A semi-active suspension system 1 for a motorcycle according to a first embodiment of the present invention is schematically shown in FIG. 1. The system 1 operates according to a control policy in accordance with the method of the present invention so as to optimize the road holding properties and the driving comfort of the motorcycle.

In the system 1, the suspended mass $M_s$ (representing for instance the body of the motorcycle) is connected to the non-suspended masses $m_{fu}$ and $m_{ru}$ (representing for instance the masses of the front and rear wheel, respectively, together with the corresponding fork, suspension arm, and pneumatic tires).

The values $X_m$, $X_f$ and X, correspond respectively to the vertical position of the suspended mass $M_s$ and of the non-suspended masses $m_{fu}$ and $m_{ru}$, respectively. An Arbitrary convention has been adopted according to which said values are positive for upward displacements of the masses and negative for downward displacements. $V_m$ represents the vertical component of the velocity of the suspended mass $M_s$, with the convention of considering positive velocity values for upward displacements. Similar considerations are valid for the values $V_f$ anf $V_r$ relating to the vertical components of the velocities of the front and rear non-suspended masses, respectively. Reference sign θ represents the angular position of the center of mass of the suspended mass $M_s$, with the convention of considering positive displacements for clockwise rotations of the suspended mass and negative displacements for counterclockwise rotations.

The system 1 comprises a front suspension system comprising a spring with coefficient $K_f$ and a controllable force generator 2 such as a controllable shock absorber for controlling the front suspension. Similarly, for the rear suspension, the system 1 comprises a spring with coefficient $K_r$ and a controllable force generator 3 such as a controllable shock absorber. In the system 1 shown in FIG. 1, the springs with coefficients $K_{ft}$ and $K_{rt}$ are further indicated together with the non-controllable shock absorbers $c_{ft}$ and $c_{rt}$. The springs represent the elasticity of the front and rear pneumatic tires while the shock absorbers represent the hysteresis of the damping of same.

In the system 1, each of the two controllable force generators 2 and 3 may be realized by means of a hydraulic cylindrical shock absorber such as a piston like shock absorber. In this kind of shock absorber, the piston and the cylinder are engaged with the suspended and the non-suspended masses by means of appropriate connectors. The vertical relative displacement of the suspended mass and of the non-suspended masses is responsible for a relative displacement between the piston and the cylinder, which, in turn, causes the displacement of a fluid within the variable chambers of the shock absorber. Said chambers may be electronically or hydraulically regulated by acting on valves connecting said chambers. An alternative solution may be adopted using fluids with controllable viscosity (electro-rheological or magneto-rheological fluids) and applying the appropriate electric and/or magnetic fields in order to vary the viscosity of the fluid. Other kinds of shock absorbers may be employed, and the following description is easily extensible for a person skilled in the art to other kinds of appropriate controllable force generators.

Force generators 2 and 3 are preferably continuous type generators. Accordingly, their state can quickly change from an Off condition wherein the damping coefficient and the corresponding damping force of the shock absorber are characterized by relatively small amplitude values (in some cases approximately equal to zero) to an On condition wherein the damping coefficient and the corresponding damping force of the shock absorber may vary within an interval of values characterized by high amplitude. Changes in the state of the shock absorbers are due to control signals $U_1$ and $U_2$. The control signals may be applied to corresponding valves and may accordingly regulate the opening positions of said valves, or they may be applied to appropriate generators of electric or magnetic fields causing the stiffening or softening of the rheological fluid so as to achieve to the desired viscosities.

Control signals $U_1$ and $U_2$ for the regulation of the controllable force generators are provided by the controller 4. The controller 4 preferably comprises a microprocessor or a microcontroller properly programmed to perform a predetermined control policy. The electronic controller 4 receives the signals from a first device 5, such as a front position sensor, from a second device 6, such as a rear position sensor, and from a third device 7 such as a gyroscope.

The first device 5 is properly mounted on the front shock absorber to generate an electrical signal $X_{bf}$ corresponding to the relative displacement between the suspended mass $M_s$ (for instance the mass of the body of the motorcycle) and the non-suspended front mass $m_{fu}$. The derivative filter 8 operates on the signal $X_{bf}$ in order to determine the relative velocity of the mass $M_s$ with respect to the front non-suspended mass $m_{fu}$ and to generate a corresponding signal $V_{bf}$ to be received by the controller 4.

The second device 6 is properly applied to the rear shock absorber to generate an electrical signal $X_{br}$ corresponding to the relative displacement between the suspended mass $M_s$ (for instance the mass of the body of the motorcycle) and the non-suspended rear mass $m_{ru}$. A derivative filter 9 operates on the signal $X_{br}$ in order to determine the relative velocity between the suspended mass $M_s$ and the non-suspended rear mass $m_{ru}$ and to generate a corresponding signal $V_{br}$ to be received by the controller 4. The derivative filters 8 and 9 may be comprised, for instance, in the electronic controller 4.

A third device 7 is properly applied to the suspended mass $M_s$ in order to generate an electrical signal $V_p$ corresponding to the angular velocity of the suspended mass and to be received by the controller 4. The person skilled in the art, on the basis of the above description, may choose among several known devices suitable for the realization of the sensors 5, 6 and 7, of the filters 8 and 9 and of the controller 4.

Moreover, alternative devices and/or alternative combinations of devices similar to those described above may be properly employed for the generation of signals to be inputted into the controller 4. For instance, the front position sensor 5 could comprise two accelerometers one of which is applied to the suspended mass $M_s$ and the other to the non-suspended front mass $m_{fu}$ and an appropriate integrator circuit generating a signal $V_{bf}$ corresponding to the relative velocity between the suspended mass $M_s$ and the non-suspended front mass $m_{fu}$ on the basis of the signals received by the accelerometers.

The controller 4 is programmed in order to operate in accordance with a control policy such as described in detail in the following description.

The controller 4 elaborates the input signals so as to jointly provide output signals 10 and 11 to the controllable force generators 2 and 3, respectively, and corresponding to the desired damping forces $F_{1d}$ and $F_{2d}$. An appropriate transformer device 12 converts the output signals 10 and 11 corresponding to the desired damping forces into signals $U_1$ and $U_2$ respectively, employed by the controllable force generators 2 and 3. For instance, the transformer 12 may convert each of the two output signals 10 and 11 into a voltage signal or into a current signal. The controllable force generators 2 and 3 react to the control signals $U_1$ and $U_2$ generating the corresponding applied damping forces $F_{1,app}$ and $F_{2,app}$, respectively. Preferably, the damping forces applied $F_{1,app}$ and $F_{2,app}$ are substantially equal to the corresponding desired damping forces $F_{1d}$ and $F_{2d}$. However, the forces actually applied to the corresponding controllable force generators may slightly differ from the corresponding desired damping forces $F_{1d}$ and $F_{2d}$ as a result of several factors influencing the performances of the force generators 2 and 3.

Figure 2:
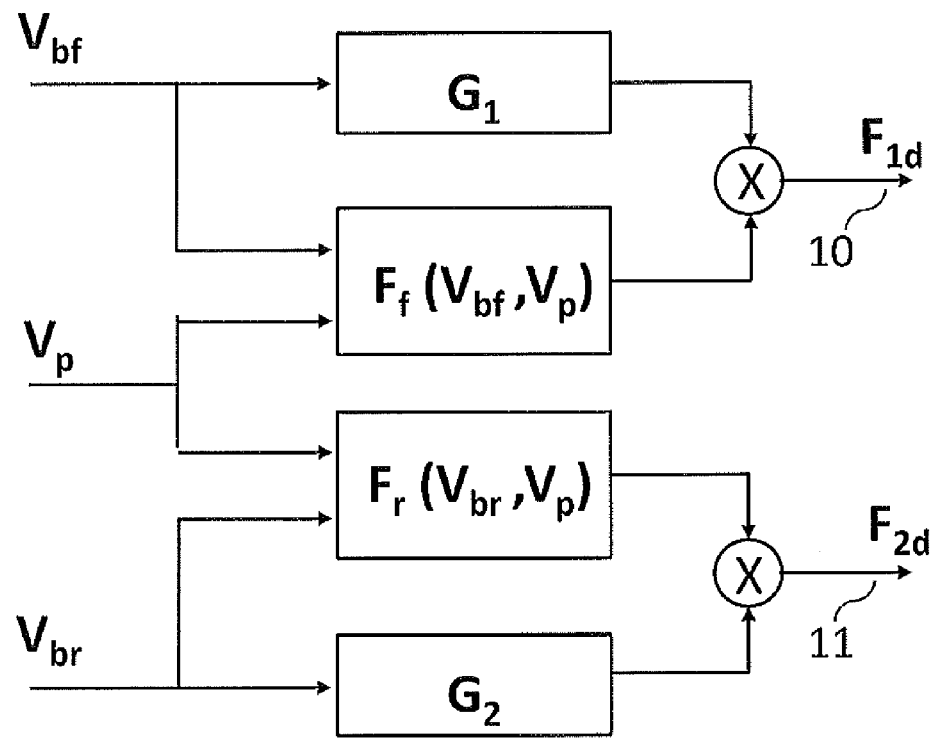
FIG. 2 displays a block diagram of the control method according to the present invention used to control the system shown in FIG. 1.

In general, and with reference to FIG. 2, the inputs of the control method according to the present invention comprise the signals $V_{bf}$, $V_{br}$, and $V_p$. Moreover, the gain values $G_1$ and $G_2$ are further introduced.

The gain value $G_1$ may take into account the specific geometry of the front shock absorber and the placement of the first device 5 on the front shock absorber. Similarly, the gain value $G_2$ may take into account the specific geometry of the rear shock absorber and the placement of the second device 6 on the rear shock absorber. Based on the gain values $G_1$ and $G_2$ and on the instantaneous velocity signals $V_{bf}$ and $V_{br}$ it may be possible to calculate a basic force which has to be applied to the front and rear shock absorbers. For instance, the product of the relative velocity $V_{bf}$ and the gain $G_1$ may be used to control the front shock absorber. Similarly, the product of the relative velocity $V_{br}$ and the gain $G_2$ may be used to control the rear shock absorber. Moreover, the basic force may be further corrected by a factor to obtain the desired damping forces $F_{1d}$ and $F_{2d}$.

As schematically shown in the block diagram displayed in FIG. 2, according to the control method of the present invention, the desired damping force $F_{1d}$ corresponds to the product of the relative velocity $V_{bf}$ (multiplied by the gain $G_1$) and an appropriate function $F_f$ of the relative velocity $V_{bf}$ and of the pitch velocity V. Moreover, according to the control method of the present invention, the desired damping force $F_{2d}$ corresponds to the product of the relative velocity $V_{br}$ (multiplied by the gain $G_2$) and an appropriate function $F_r$ of the relative velocity $V_{br}$ and of the pitch velocity $V_p$. Both correction functions $F_f$ and $F_r$ may be implemented as a table or a mathematical equation that can be evaluated by the processor of the controller 4.

Function $F_f$ and $F_r$ jointly contribute to determining the control policy according to the present invention on the basis of two appropriate three-dimensional control surfaces. In particular, the function $F_f$ takes into account the signs of the values of the relative velocity $V_{bf}$ and the pitch velocity $V_p$, respectively, so as to identify several functioning regions each of which is characterized by a special combination of the pressing or extension condition acting on the front shock absorber and the motion directions of the suspended mass and the non suspended front mass. Similarly, the function $F_r$ takes into account the sign of the value corresponding respectively to the relative velocity $V_{br}$ and to the pitch velocity $V_p$ in order to identify several functioning regions each of which is characterized by a special combination of the pressing or extension conditions of the rear shock absorber and of the motion directions of the suspended mass and of the non suspended rear mass.

By employing several values for the control gain by means of the control functions $F_f$ and $F_r$ it is possible to jointly regulate the desired damping forces to be generated by the controllable shock absorbers 2 and 3, for instance in order to reduce the oscillations of the front and rear wheels (non suspended front and rear masses) and of the body of the motorcycle (suspended mass) optimizing the driving comfort and the road holding performances.

For example, a negative value of the relative velocity $V_{br}$, a positive value of the pitch velocity $V_p$ and a positive value of the relative velocity $V_{bf}$ indicate the simultaneous realization of the following conditions: the rear shock absorber is compressed, the non-suspended rear mass undergoes an upward motion, the front shock absorber is extended, the non-suspended front mass undergoes a downward motion and the suspended mass undergoes a clockwise rotation. In response to such conditions, the control method according to the present invention may provide for a stiffening of the rear suspension (high value of the damping force $F_{2d}$ desired) in order to reduce the oscillation of the rear wheel so as to improve the road holding performance and a simultaneous softening of the front suspension (low intensity value of the damping force $F_{1d}$ desired) so as to reduce the oscillation of the front wheel so as to improve the driving comfort.

Similar considerations may be employed in relation to the other functioning regions corresponding to other combinations of the signs and the values of the relative velocity $V_b$, and $V_{bf}$ and of the pitch velocity $V_p$.

Figure 3:
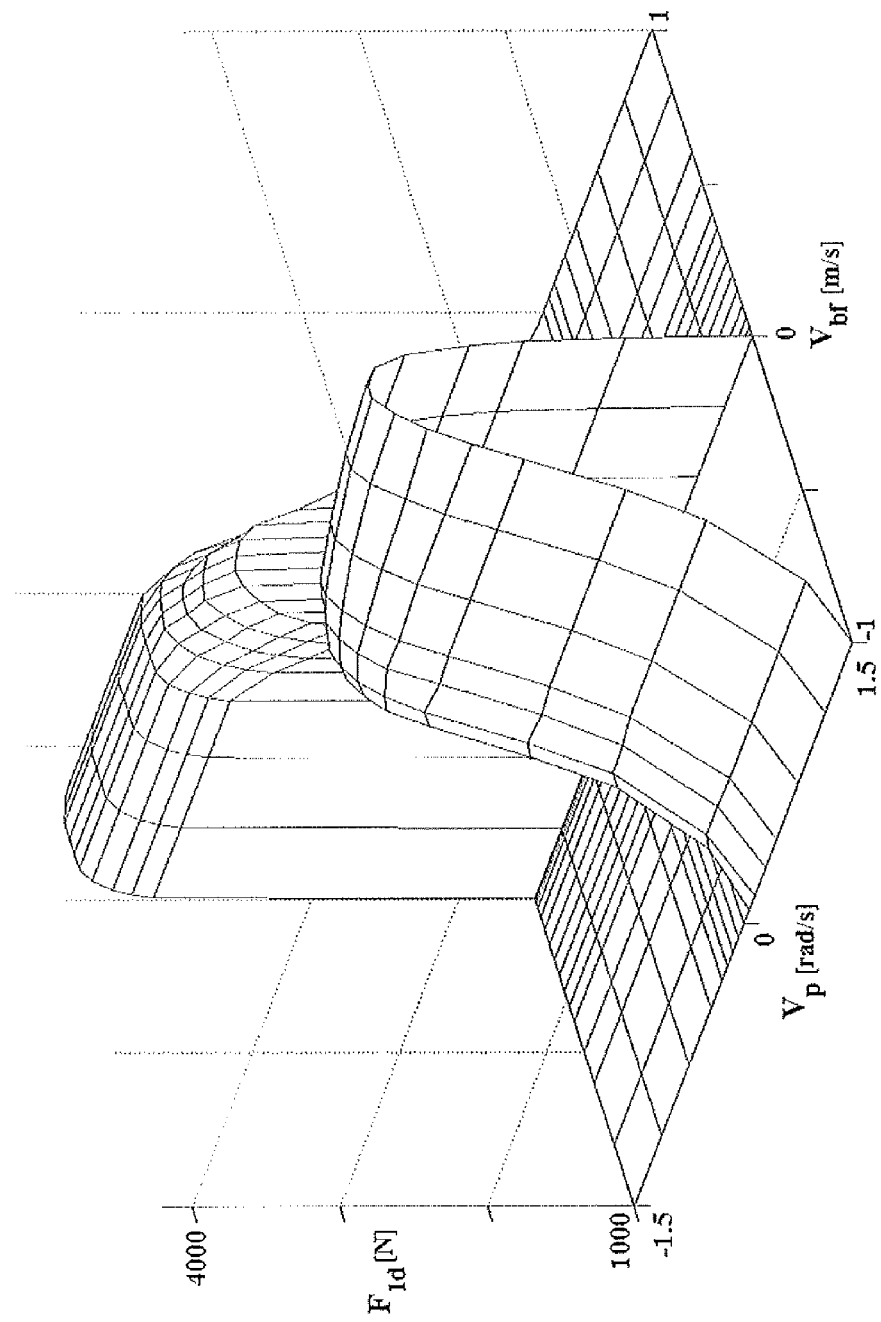
FIG. 3 is a three-dimensional view of a control surface employed for instance in the control method shown in FIG. 2.

FIG. 3 displays a typical example of a three-dimensional control surface obtainable with the method according to the present invention.

Figure 4:
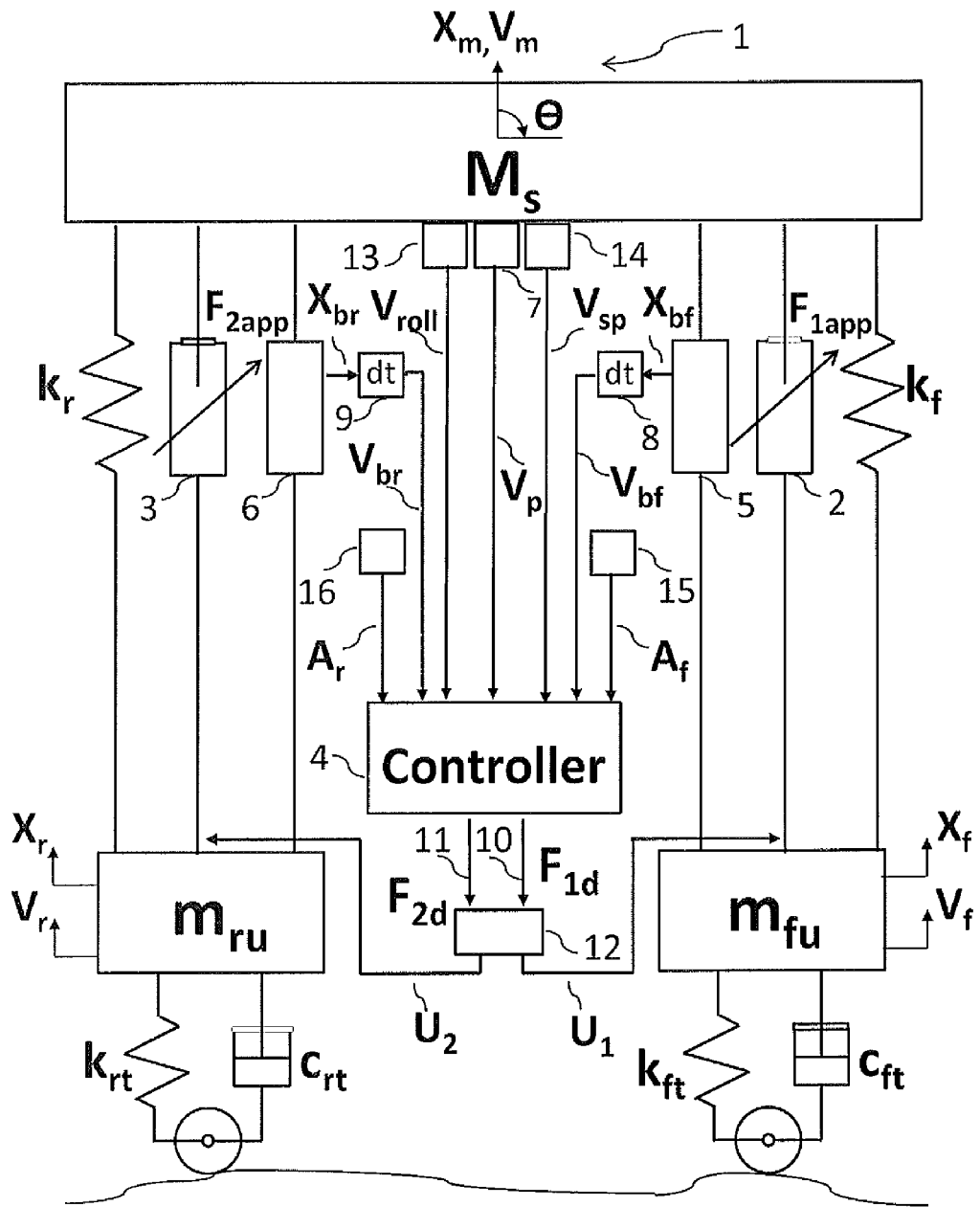
FIG. 4 schematically displays a second embodiment of the system according to the present invention.

A second preferred embodiment of the present invention is schematically shown in FIG. 4. Further to the signals already mentioned with respect to the embodiment shown in FIG. 1, the controller 4 according to the second embodiment receives also the further input signals from appropriate measuring means 13, 14, 15 and 16: a signal $V_{roll}$ corresponding to the angular roll velocity of the suspended mass $M_s$, a signal $V_{sp}$ corresponding to the longitudinal velocity of the suspended mass, a signal $A_f$ corresponding to the actuation of the braking means acting on the front non-suspended mass (for instance, the front brake acting on the front wheel), a signal $A_r$ corresponding to the actuation of the braking means acting on the rear non-suspended mass (for instance, the rear brake acting on the rear wheel).

More precisely, the signals $A_r$ and $A_r$ may be on-off signals respectively indicating whether the front and rear braking means are actuated or not.

In this way different distributions of the loads acting on the front and rear wheels can be determined from the lateral acceleration, longitudinal acceleration, and/or velocity of the vehicle and used to jointly adjust the damping coefficients of the front and rear shock absorbers contributing to the further improvement of the driving comfort and the stability of the vehicle.

Figure 5:
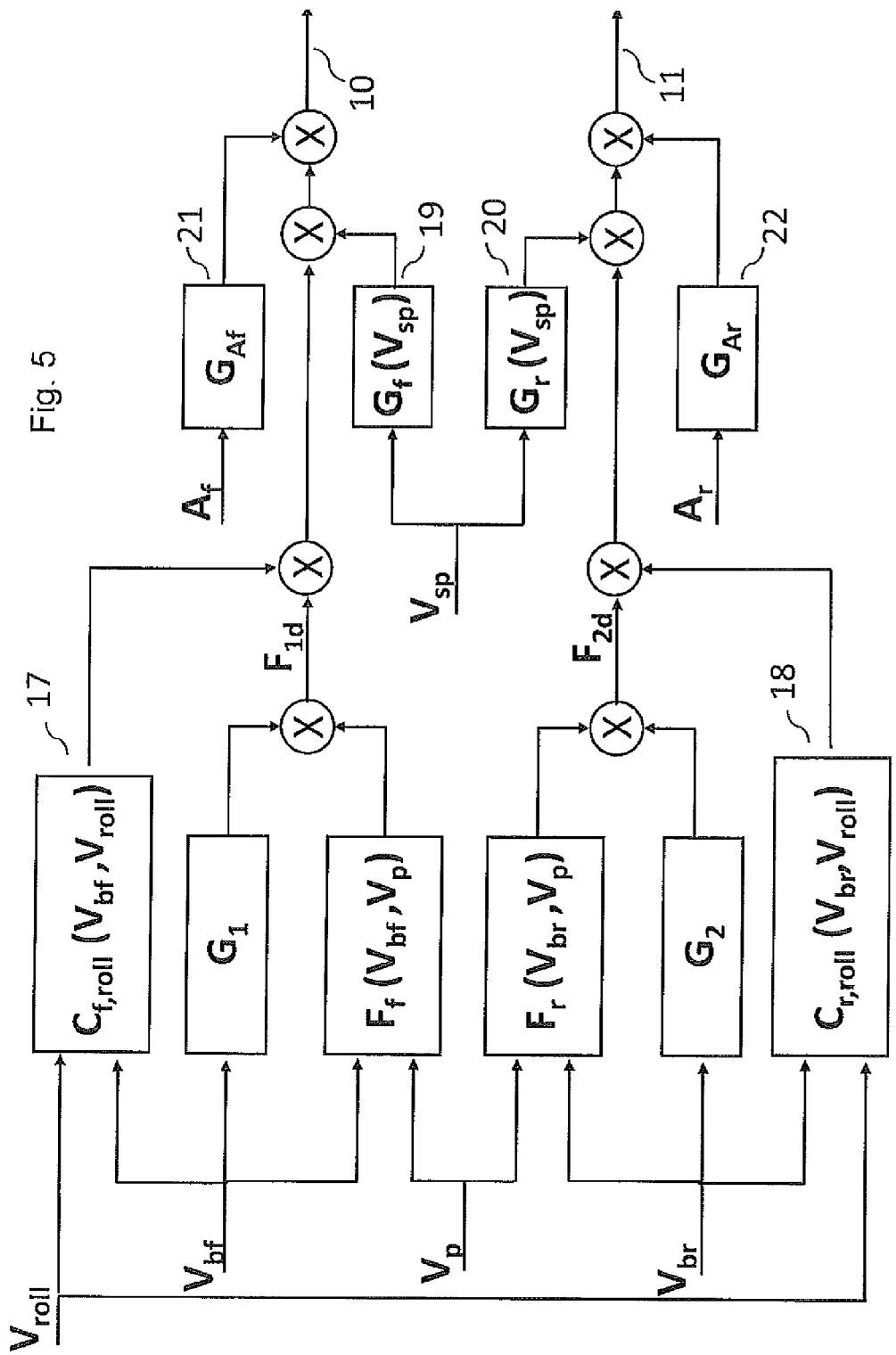
FIG. 5 displays a block diagram of the control method according to the present invention used for the control of the system shown in FIG. 4.

Within the ambit of this second embodiment, the controller 4 can be programmed to operate according to a method of the present invention as schematically described in FIG. 5.

In particular, both damping desired force $F_{1d}$ and $F_{2d}$ calculated as shown in the previous description relating to the first embodiment with reference to FIG. 2, are now further multiplied by appropriate gain coefficients further dependent on the input signals $V_{roll}$, $V_{sp}$, $A_f$ and $A_r$.

With reference to FIG. 5, the gain adjusting means 17 and 18 correct the desired damping forces $F_{1d}$ and $F_{2d}$ with multiplicative factors deriving from the control surfaces $C_{f,roll}(V_{bf}, V_{roll})$ and $C_{r,roll}(V_{br}, V_{roll})$ both dependent on the roll velocity signal $V_{roll}$ (so as to further take into account a coupling of the suspension motions of the front and rear suspension) and on the correspondent relative velocity signals $V_{bf}$ or $V_{br}$.

Figure 6:
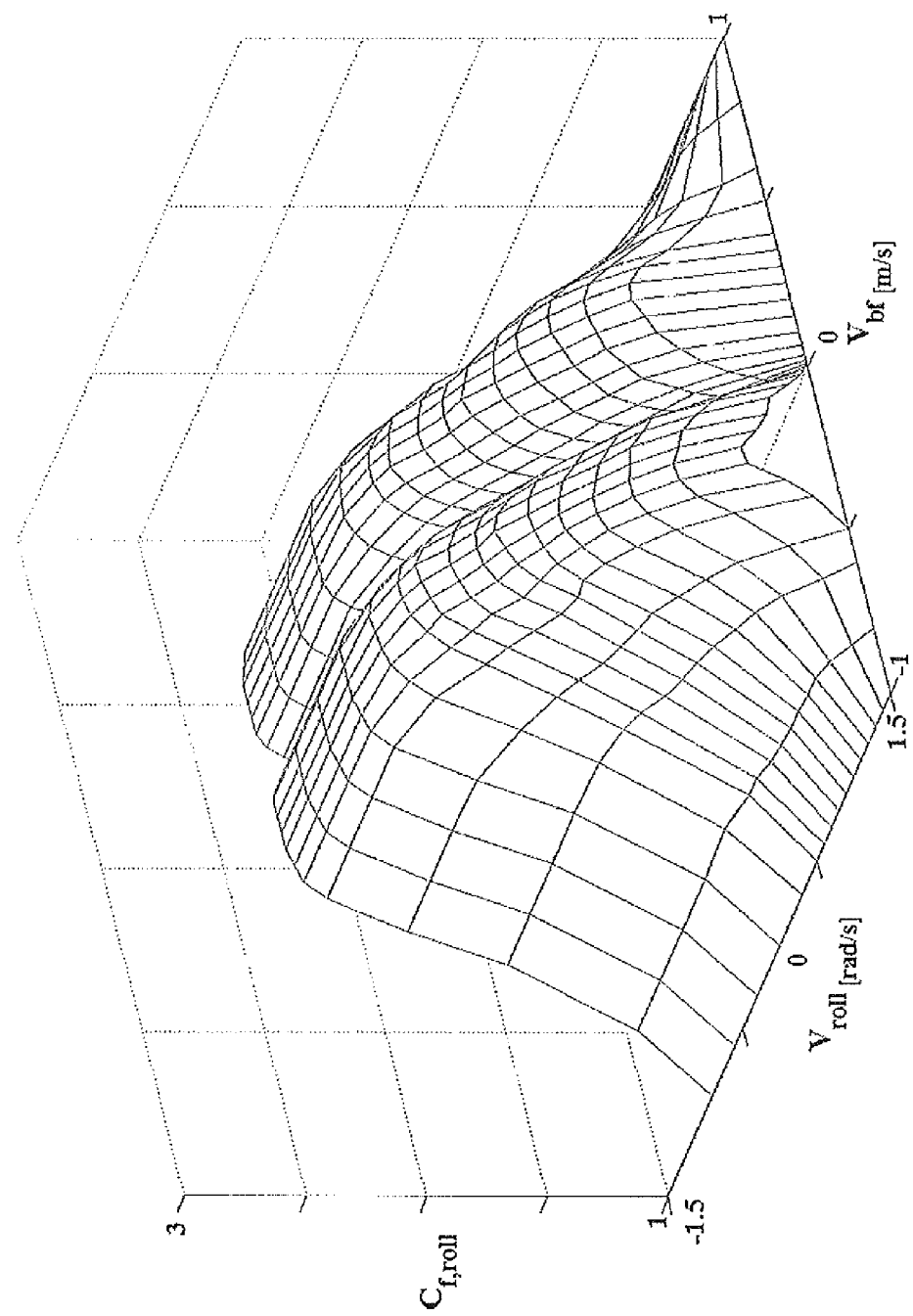
FIG. 6 is a three-dimensional view of a control surface employed for instance in the control method shown in FIG. 5.

The magnitude of the roll velocity $V_{roll}$ makes it possible to identify when the motorcycle is entering or exiting a corner. In particular, when entering or exiting a corner, the magnitude of the roll velocity $V_{roll}$ reaches a peak, which depends on the ratio between the advancing speed of the motorcycle and the radius of curvature of the trajectory. Based on the relative velocities $V_{bf}$ and $V_{br}$ and on the roll velocity $V_{roll}$, it is possible to determine the correction values $C_{f,roll}(V_{bf}, V_{roll})$ and $C_{r,roll}(V_{br}, V_{roll})$ for the desired damping forces $F_{1d}$ and $F_{2d}$. The corrected damping forces $F_{1d}$ and $F_{2d}$ can then be applied to the front and rear shock absorbers in order to countervail the compression acting on the shock absorbers. Said compression is much larger than the compression experienced in a straight trajectory. The additional load experienced by the shock absorbers while driving around a corner is due to the centrifugal force acting on the suspended mass $M_s$, said centrifugal force having a non-zero component along the vertical axis of symmetry of the motorcycle. FIG. 6 displays the three-dimensional control surface $C_{f,roll}(V_{bf}, V_{roll})$ that can be adopted as correcting factor for correcting the damping force of the front shock absorber and dependent on the roll velocity of the suspended mass.

In FIG. 5, the gain means 19 and 20 correct the desired damping forces $F_{1d}$ and $F_{2d}$ with multiplication factors $G_f(V_{sp})$ and $G_r(V_{sp})$, both dependent on the longitudinal velocity signal of the motorcycle $V_{sp}$.

The gain regulation means 21 and 22 in FIG. 5 correct the desired damping forces $F_{1d}$ and $F_{2d}$, respectively, with the multiplicative factors $G_{Af}$ and $G_{Ar}$, both dependent on the actioning signal of the braking means of the front and rear wheels, respectively ($A_f$ and $A_r$).

In particular, the following expression is hold for $G_{Af}$:

$$G_{Af} = \begin{cases} 1 & \text{if } A_f = 0 \\ g > 1 & \text{if } A_f(t) = 1 \; \forall \, t \in [0 \div T] \text{ ms} \end{cases}$$

Therefore, the control policy according to the present invention implies an increase in the desired damping force $F_{1d}$ for the controllable front shock absorber when the signal $A_f$ is kept in the "on-state" during a predefined time interval. Same holds also true for the multiplicative factor $G_{Ar}$.

Figure 7:
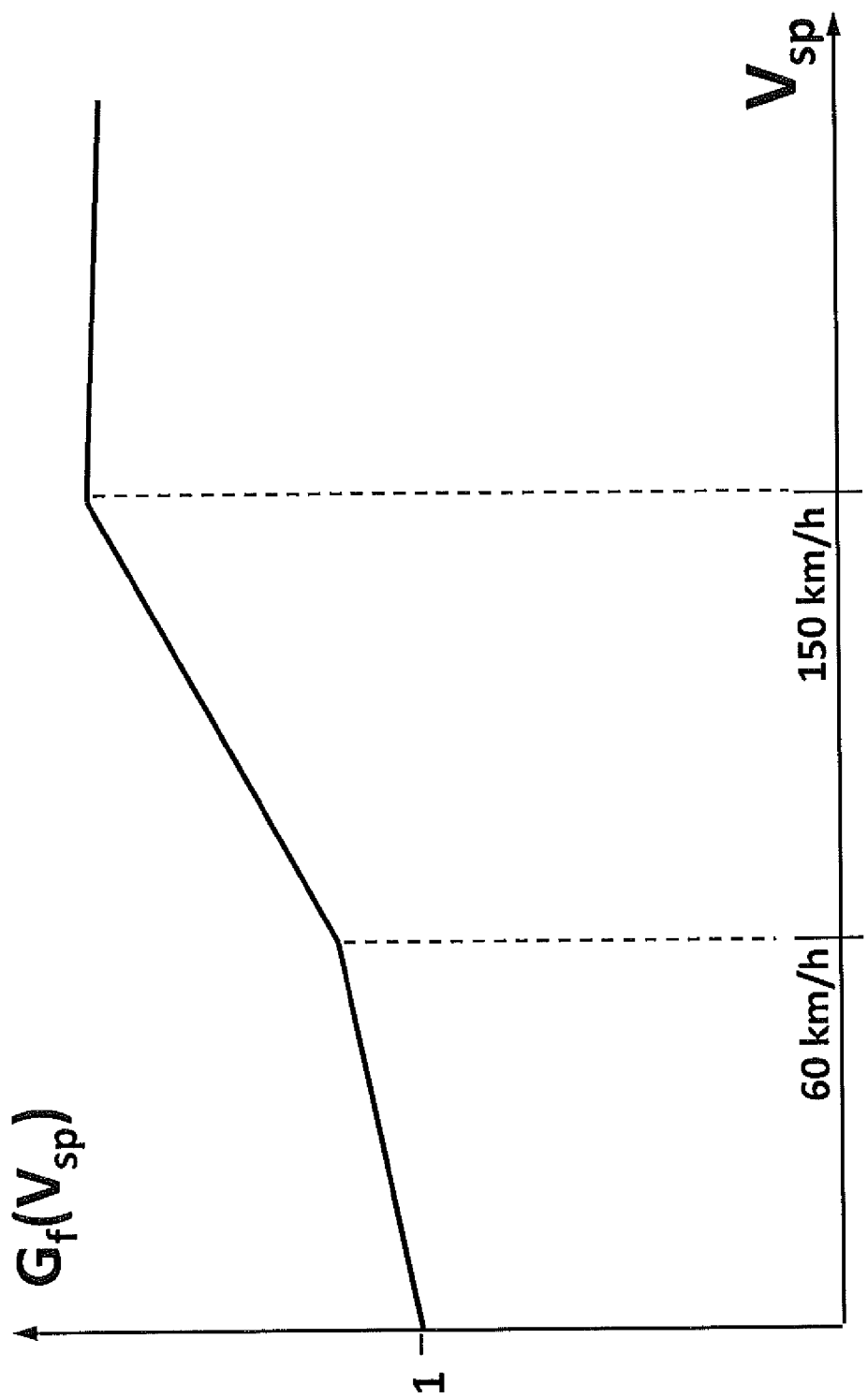
FIG. 7 is a graph showing the correction gain $G_f(V_{sp})$ for the desired damping force $F_{1d}$ with respect to the longitudinal velocity $V_{sp}$ of the motorcycle.

FIG. 7 shows an example of the multiplicative factor $G_f(V_{sp})$ introduced with reference to FIG. 5. The slope of the correction gain changes in three steps with the motorcycle speed $V_{sp}$. In the low speed region (up to 60 km/h), the growth rate of the correction gain $G_f(V_{sp})$ is low. In the intermediate speed region (from 60 km/h to 150 km/h) the slope of the function $G_f(V_{sp})$ is very high. Finally, in the high speed region (over 150 km/h), a slightly negative rate of the correction gain $G_f(V_{sp})$ with respect to the motorcycle velocity is considered. The multiplication factor $G_r(V_{sp})$ shows an analogous behavior.

Figure 8:
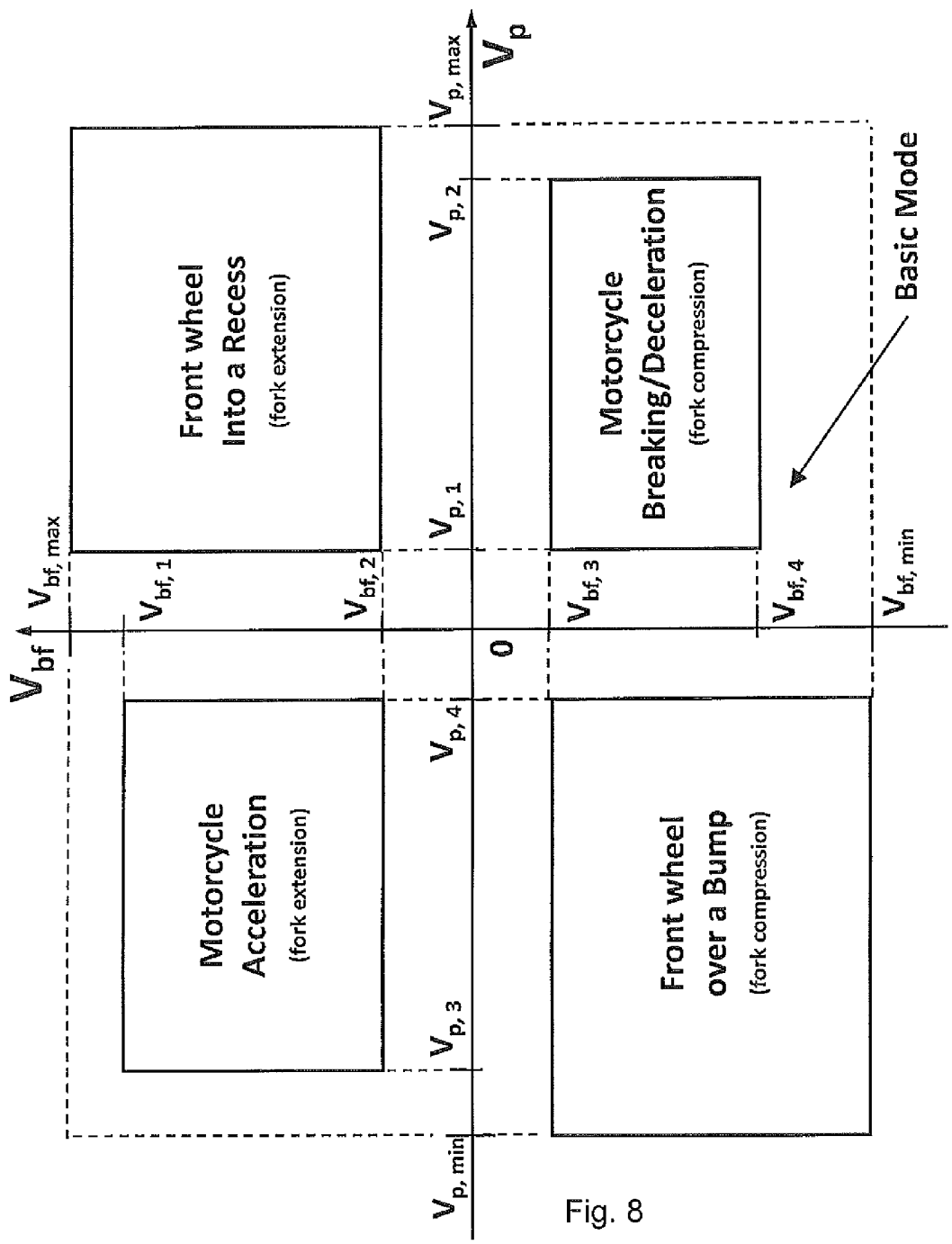
FIG. 8 is a graph showing the different dynamics of the motorcycle with respect to the combinations of pitch velocity V, and relative velocity $V_{bf}$.

In the following, the meaning of the functions $F_f$ and $F_r$ and the relationship between said functions and the functioning regions identified by the pitch and relative velocities will be explained in an exhaustive manner with reference to FIGS. 8 and 9.

As previously described, the functions $F_f$ and $F_r$ jointly contribute to determine the control policy according to the present invention. In particular, the function $F_f$ associates a specific instantaneous operating condition of the motorcycle to every possible motion condition experienced by the suspended mass $M_s$ and the non-suspended front mass $m_{fu}$. The operating condition may be, for instance, a breaking operation of the motorcycle or the front wheel rolling on a bump and may identify a first functioning region. Similarly, the function $F_r$ associates a specific instantaneous operating condition of the motorcycle to every possible motion condition experienced by the suspended mass $M_s$ and the non-suspended rear mass $m_{ru}$. In this case, the operating condition may be, for instance, an accelerating operation of the motorcycle or the front wheel crossing a depression of the street surface and may identify a second functioning region.

Consequently, the functions $F_f$ and $F_r$ jointly determine the kind of stresses experienced by the front and rear shock absorbers by respectively comparing the values and signs of the pitch velocity V, and the relative velocities $V_{bf}$ and $V_{br}$ with predefined threshold values. Said comparison allows to establish whether the motion of the suspended mass $M_s$ is predominant over the motions of the non-suspended masses $m_{fu}$ and $m_{ru}$ or vice versa. A diagram wherein several operating conditions of the motorcycle are associated to the corresponding values of the relative front velocity signal $V_{bf}$ and the pitch velocity signal $V_p$ is shown in FIG. 8.

Once the kind of stress has been determined, the functions $F_f$ and $F_r$ are built by solving the half-car model. In particular, for any one of the shock absorbers a correction is determined, which can be applied to the basic force value obtained by combining the gain values $G_1$ and $G_2$ with the velocity signals $V_{bf}$ and $V_{br}$, respectively. Subsequently, the desired damping forces $F_{1d}$ and $F_{2d}$ can be calculated so as to optimize a predefined performance index that takes into account the road holding (represented by the vertical load on the non-suspended masses $m_{fu}$ and $m_{ru}$) and the degree of comfort (represented by the acceleration of the suspended mass $M_s$).

As an example, a situation wherein the rear wheel is passing over a bump while the front wheel is crossing a depression implies the compression of the rear shock absorber, the extension of the front shock absorber and the deceleration of the suspended mass which undergoes a clockwise rotation. In this case, the functions $F_f$ and $F_r$ will determine the corrections to the damping forces of the shock absorber which optimize the road holding and the comfort of the motorcycle.

The correction functions $F_f$ and $F_r$ respectively define a three-dimensional control surface though which it is possible to jointly regulate the desired damping forces to be generated by the controllable shock absorbers 2 and 3 in order to reduce the oscillations of the front and rear wheels (non suspended front and rear masses) and of the body of the motorcycle (suspended mass), thereby optimizing the driving comfort and the road holding performances of the vehicle.

Figure 9:
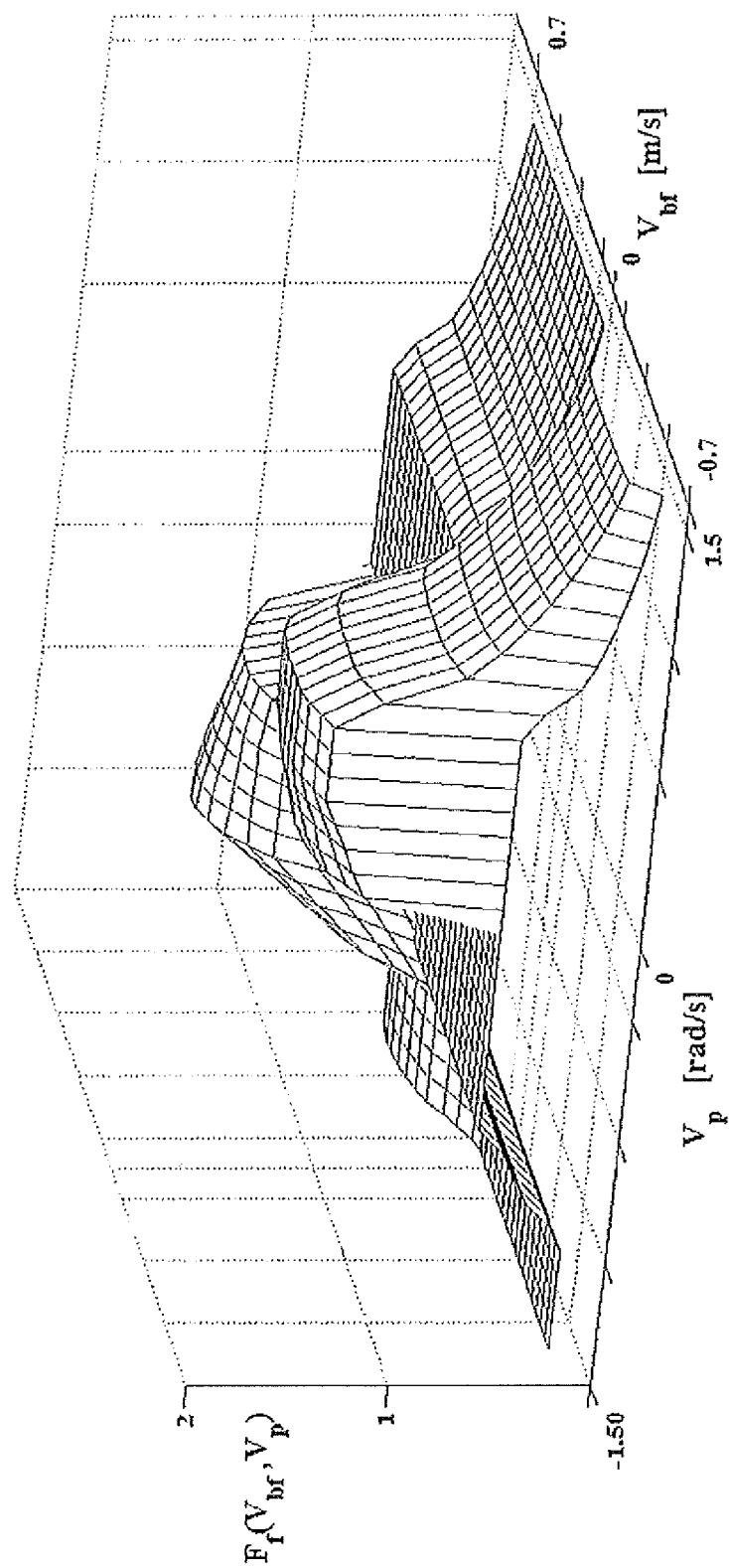
FIG. 9 is an alternative three-dimensional view of a control surface employed for instance in the control method shown in FIG. 2.

FIG. 9 depicts an example of a three-dimensional control surface $F_f(V_{bf}, V_p)$ for the correction function $F_f$ obtainable with the method according to the invention. In particular, different correction gains are computed by solving the equation of the half-car model. Then, the calculated points are joined by a surface whose gradients with respect to the pitch velocity $V_p$ and relative velocity $V_{bf}$ fall within a suitable predefined range of values in order to limit the peaks in the acceleration of the suspended mass $M_s$ and the non suspended front mass $m_{fu}$, respectively. Similarly, the three-dimensional control surface for $F_r$ exhibits an analogous behavior.

Figure 10:
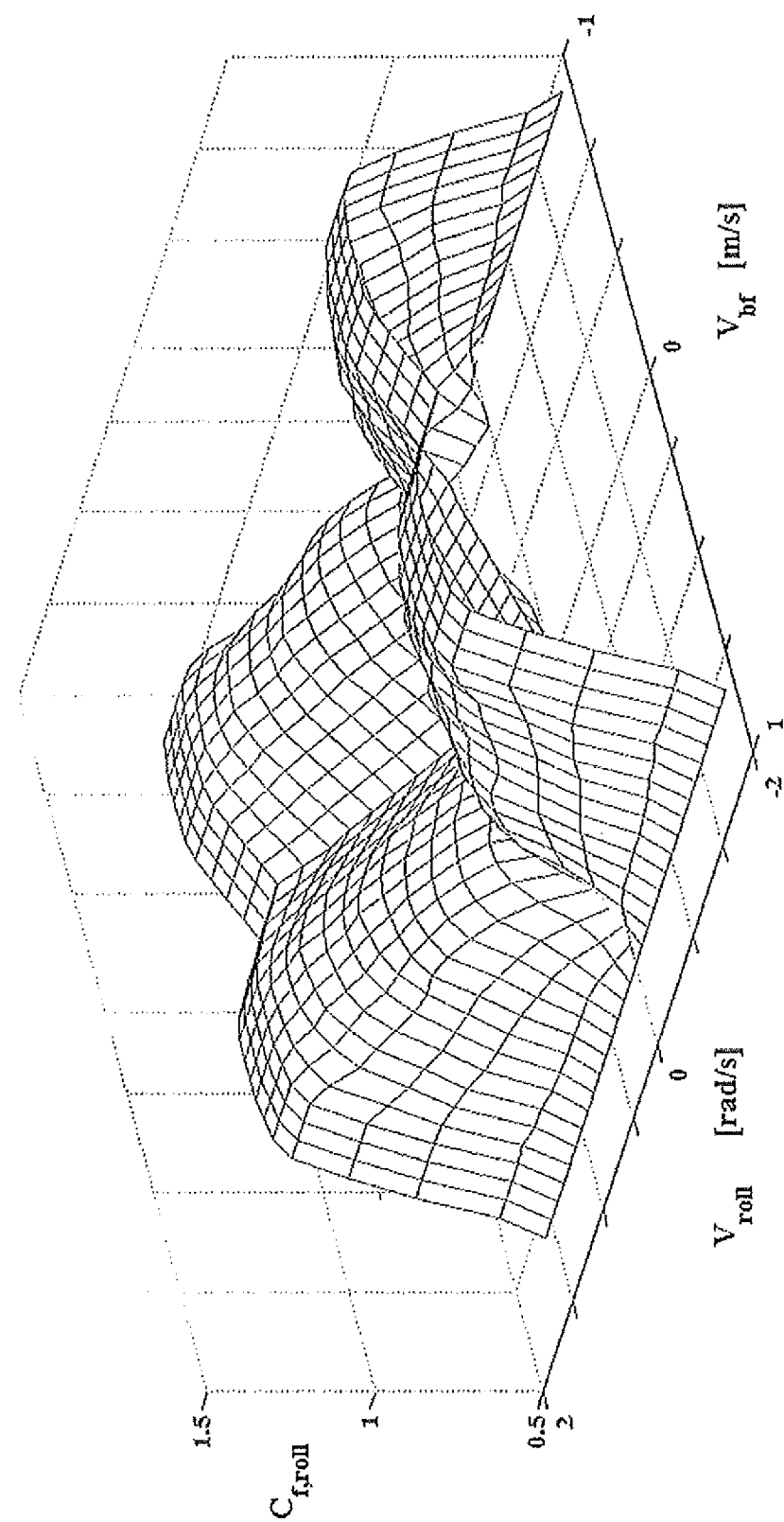
FIG. 10 shows a further example of a control surface employed for instance in the control method shown in FIG. 5.

FIG. 10 shows a further example of the three-dimensional control surface $C_{r,roll}(V_{bf}, V_{roll})$ already described with reference to FIG. 6. In order to obtain the control surface, several correction values can be determined by solving the half-car model equations for the motorcycle in stationary conditions for various predefined values of the angle of roll. Subsequently, said correction values can be joined by a surface whose gradients with respect to the velocity of roll $V_{roll}$ and to the relative velocity $V_{bf}$ fall within a suitable predefined range of values so as to avoid peaks in the acceleration of the suspended mass $M_s$. The three-dimensional control surface for the correction $C_{r,roll}$ can be determined in an analogous manner.

The method according to the present invention, allow for the complete exploitation of the properties of the suspension system of the motorcycle, guaranteeing a better adherence of both the front and rear pneumatic tires to the road surface and/or a better driving comfort because of the joint control of the front and rear suspensions based on a complete model of the motorcycle dynamics in the longitudinal plane of symmetry of the motorcycle.

The invention claimed is:

1. A semi-active suspension system for a motorcycle having a suspended mass including a motorcycle body and a non-suspended mass including front and rear wheels comprising:
    front relative velocity means, coupled between the suspended mass of the motorcycle body and the non-suspended mass of the front wheel, for providing a front relative velocity signal representative of the relative velocity between the suspended mass of the motorcycle body and the non-suspended mass of the front wheel;
    rear relative velocity means, coupled between the suspended mass of the motorcycle body and the non-suspended mass of the rear wheel, for providing a rear relative velocity signal representative of the relative velocity between the suspended mass of the motorcycle body and the non-suspended mass of the rear wheel;

pitch velocity means, coupled to the suspended mass of the motorcycle body, for providing a pitch velocity signal representative of a pitch velocity of the suspended mass of the motorcycle body;

a front controllable force generator placed between the suspended mass of the motorcycle body and the non-suspended mass of the front wheel;

a rear controllable force generator placed between the suspended mass of the motorcycle body and the non-suspended mass of the rear wheel;

a controller coupled to said front relative velocity means, rear relative velocity mans, pitch velocity means, front controllable force generator, and rear controllable force generator;

wherein said controller provides control signals for regulation of said front and rear controllable force generators based on a predetermined control policy for optimizing global adherence of the motorcycle to a road surface, the predetermined control policy comprises a three dimensional control surface defined by a function of the front relative velocity signal, the rear relative velocity signal, and the pitch velocity signal, and the three-dimensional control surface is calculated to provide a predetermined performance index comprising a vertical load on the front and rear non-suspended masses and acceleration, whereby the predetermined performance index is optimized taking into account road handling and degree of comfort;

wherein said controller provides a multiplicative factor control signal for further regulation of said front and rear controllable force generators providing variable damping as a function of speed of the motorcycle wherein the multiplicative factor control signal has a first growth rate having a first slope at a lower motorcycle speed, a second growth rate having a second slope at an intermediate motorcycle speed, and a third growth rate having a third slope at a higher motorcycle speed, wherein the first slope is less than the second slope and the third slope is negative relative to the first and second slopes; and wherein said controller provides control signals for regulation of said front and rear controllable force generators and the multiplicative factor control signal has a slope of a correction gain of the variable damping and changes in three steps with respect to motorcycle speed, wherein the lower motorcycle speed region is up to 60 km/hour, wherein the intermediate motorcycle speed region is from 60 to 150 km/hour, and wherein the higher motorcycle speed region is over 150 km/hour, whereby driving and traveling comfort of the motorcycle is improved.

* * * * *